United States Patent
Yang

(10) Patent No.: US 11,270,097 B2
(45) Date of Patent: Mar. 8, 2022

(54) ELECTRONIC DEVICE HAVING FINGERPRINT SENSING FUNCTION AND FINGERPRINT SENSING METHOD

(71) Applicant: Egis Technology Inc., Taipei (TW)

(72) Inventor: Chang Wei Yang, Taipei (TW)

(73) Assignee: Egis Technology Inc., Hsinchu (TW)

(*) Notice: Subject to any disclaimer, the term of this patent is extended or adjusted under 35 U.S.C. 154(b) by 0 days.

(21) Appl. No.: 17/092,330

(22) Filed: Nov. 9, 2020

(65) Prior Publication Data

US 2021/0357611 A1 Nov. 18, 2021

Related U.S. Application Data

(60) Provisional application No. 63/025,161, filed on May 14, 2020.

(30) Foreign Application Priority Data

Sep. 17, 2020 (CN) .................. 2020109824310.8

(51) Int. Cl.
*G06K 9/00* (2006.01)

(52) U.S. Cl.
CPC .................. *G06K 9/0004* (2013.01)

(58) Field of Classification Search
None
See application file for complete search history.

(56) References Cited

U.S. PATENT DOCUMENTS

| 2013/0201091 A1 | 8/2013 | Hung |
| 2014/0286545 A1 | 9/2014 | Yi et al. |
| 2017/0169275 A1* | 6/2017 | Mackey .............. G09G 3/3426 |
| 2020/0051276 A1 | 2/2020 | Li et al. |

FOREIGN PATENT DOCUMENTS

| CN | 107454963 | 12/2017 |
| CN | 107656665 | 2/2018 |
| CN | 107844693 | 3/2018 |
| CN | 108846371 | 11/2018 |
| CN | 109154961 | 1/2019 |

(Continued)

OTHER PUBLICATIONS

"International Search Report (Form PCT/ISA/210)" of PCT/CN2020/115865, dated Feb. 20, 2021, pp. 1-5.

(Continued)

*Primary Examiner* — Joseph R Haley
(74) *Attorney, Agent, or Firm* — JCIPRNET

(57) ABSTRACT

An electronic device, having fingerprint sensing function, is provided. The electronic device includes a display panel and a sensing module. The display panel has a surface configured to be pressed by a finger of a user. The sensing module is disposed under the display panel. The display panel displays a bright area in a fingerprint sensing area to emit an illumination beam to the finger. The sensing module obtains a base fingerprint image correspondingly. The display panel then displays the base fingerprint image in the fingerprint sensing area, so as to use the base fingerprint image as a light pattern to illuminate the finger. The sensing module obtains a second fingerprint image correspondingly. A fingerprint sensing method is also provided.

13 Claims, 2 Drawing Sheets

(56) References Cited

FOREIGN PATENT DOCUMENTS

| CN | 110400812 | 11/2019 |
| CN | 110543821 | 12/2019 |
| CN | 110969126 | 4/2020 |
| TW | I592881 | 7/2017 |
| TW | M604923 | 12/2020 |

OTHER PUBLICATIONS

"Written Opinion of the International Searching Authority (Form PCT/ISA/237)" of PCT/CN2020/115865, dated Feb. 20, 2021, pp. 1-4.
"Office Action of Taiwan Counterpart Application", dated Mar. 15, 2021, p. 1-p. 13.

* cited by examiner

ELECTRONIC DEVICE HAVING FINGERPRINT SENSING FUNCTION AND FINGERPRINT SENSING METHOD

CROSS-REFERENCE TO RELATED APPLICATION

This application claims the priority benefit of U.S. provisional application Ser. No. 63/025,161, filed on May 14, 2020, and China application serial no. 202010982431.8, filed on Sep. 17, 2020. The entirety of each of the above-mentioned patent applications is hereby incorporated by reference herein and made a part of this specification.

BACKGROUND

Technical Field

The invention relates to an electronic device having a sensing function and a sensing method, and particularly relates to an electronic device having a fingerprint sensing function and a fingerprint sensing method.

Description of Related Art

Along with development of portable electronic devices towards a larger screen-to-body ratio, conventional capacitive fingerprint sensor arranged on the front of the electronic device is no longer applicable since the capacitive fingerprint sensor may occupy excessive area of the front of the electronic device, which makes it difficult to increase the screen-to-body ratio. Under such trend, an under-screen fingerprint sensing module is developed.

In an under-screen optical fingerprint sensor module, a sensing module sensor disposed under a display panel reads a fingerprint of a finger pressing on the display panel for fingerprint recognition. However, due to a low light transmittance of the display panel, only about 1% to 3% of light may penetrate through the display panel. Therefore, a light signal from the finger and received by the sensing module sensor is weak, resulting in a low contrast of a read fingerprint image. The fingerprint image with low contrast is more likely to cause recognition failure.

SUMMARY

The invention is directed to an electronic device having fingerprint sensing function, which effectively improves contrast between bright lines and dark lines in a fingerprint image.

The invention is directed to a fingerprint sensing method, which effectively improves contrast between bright lines and dark lines in a fingerprint image.

An embodiment of the invention provides an electronic device having fingerprint sensing function, which includes a display panel and a sensing module. The display panel has a surface configured to be pressed by a finger of a user. The sensing module is disposed under the display panel. The display panel displays a bright area in a fingerprint sensing area to emit an illumination beam to the finger. The sensing module obtains a base fingerprint image correspondingly. The display panel then displays the base fingerprint image in the fingerprint sensing area, so as to use the base fingerprint image as a light pattern to illuminate the finger. The sensing module obtains a second fingerprint image correspondingly.

An embodiment of the invention provides a fingerprint sensing method including the following steps. A display panel is used to display a bright area in a fingerprint sensing area to illuminate a finger pressing on the display panel. A base fingerprint image is obtained. The first fingerprint image is displayed in the fingerprint display area to illuminate the finger. A second fingerprint image is obtained.

In the electronic device having fingerprint sensing function and the fingerprint sensing method of the embodiments of the invention, since the base fingerprint image acquired for the first time is displayed in the fingerprint display area to illuminate the finger, the fingerprint image obtained for the second time may have a higher contrast, so that a success rate and accuracy of fingerprint recognition are effectively improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
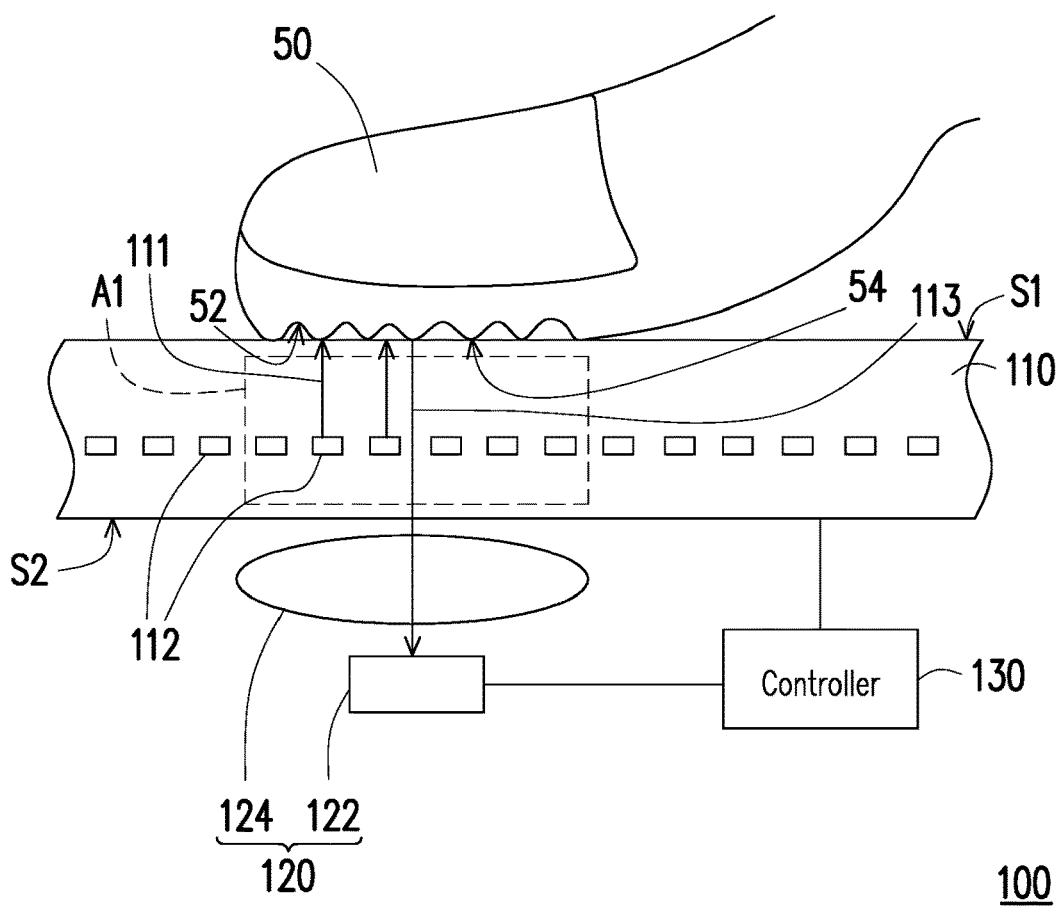
FIG. 1 is a schematic structural diagram of an electronic device having fingerprint sensing function according to an embodiment of the invention.
Figure 2:
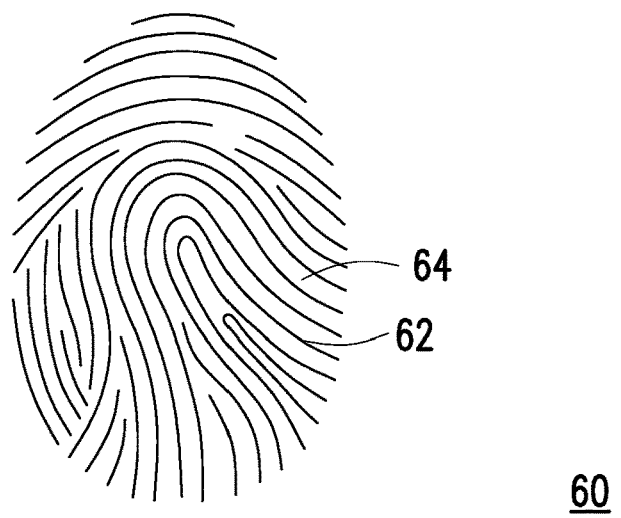
FIG. 2 is a schematic diagram of a base fingerprint image displayed by the electronic device having fingerprint sensing function of FIG. 1 in a fingerprint sensing area.

FIG. 1 is a schematic structural diagram of an electronic device having fingerprint sensing function according to an embodiment of the invention, and FIG. 2 is a schematic diagram of a base fingerprint image displayed by the electronic device having fingerprint sensing function of FIG. 1 in a fingerprint sensing area. Referring to FIG. 1 and FIG. 2, an electronic device 100 having fingerprint sensing function of the embodiment includes a display panel 110, a sensing module 120 and a controller 130. The electronic device 100 having fingerprint sensing function is, for example, a smart phone, a feature phone, a tablet computer, a notebook computer, a personal digital assistant (PDA) or other appropriate electronic devices. The display panel 110 has a first surface S1 and a second surface S2 opposite to each other, where the first surface S1 is adapted to be press by a finger 50 of a user. In the embodiment, the display panel 110 is, for example, an organic light-emitting diode (OLED) display panel. However, in other embodiments, the display panel 110 may also be a liquid crystal display panel or other suitable display panels. In the embodiment, the display panel 110 has a plurality of pixels 112 arranged in an array, the pixels 112 emit an illumination beam 111 to the finger 50, and the finger 50 reflects the illumination beam 111 into a signal beam 113, where the signal beam 113 carries fingerprint information of the finger 50.

The sensing module 120 is disposed under the display panel 110, and is configured to read (for example, photograph) a fingerprint image of the finger 50. In the embodiment, the sensing module 120 may include an image sensor 122 and an imaging element 124. The signal beam 113 from the finger 50 is transmitted to the image sensor 122 through the imaging element 124, so that the image sensor 122 may sense the fingerprint image. In the embodiment, the imaging element 124 is, for example, an imaging lens, a collimator, a lens array, a fiber optical plate, or other suitable imaging element 124. The image sensor 122 is, for example, a complementary metal oxide semiconductor (CMOS) image sensor or a charge coupled device (CCD).

The controller 130 is electrically connected to the display panel 110 and the sensing module 120. When the fingerprint image is to be read, the controller 130 first controls the display panel 110 to display a bright area in a fingerprint sensing area A1. In the embodiment, the bright area is a uniform bright area, i.e., the controller 130 first controls the pixels 112 in the fingerprint sensing area A1 to emit light with same brightness and color, and the uniform bright area is, for example, a uniform green bright area, a uniform white bright area or a uniform bright area of other colors.

Meanwhile, the controller 130 commands the sensing module 120 to read the signal beam 113 reflected by the finger 50 to obtain a base fingerprint image 60. Then, the controller 130 controls the display panel 110 to display the base fingerprint image 60 in the fingerprint sensing area A1, so as to use the base fingerprint image 60 as a light pattern to illuminate the finger 50, and the controller 130 commands the sensing module 120 to read the signal beam 113 reflected by the finger 50 again and obtain a second fingerprint image.

In operation, fingerprint ridges 54 of the finger 50 may contact the first surface S1, and fingerprint grooves 52 may not contact the first surface S1, so that the fingerprint ridges 54 may form bright lines in the fingerprint image, and the fingerprint grooves 52 may form dark lines in the fingerprint image. The base fingerprint image read by the sensing module 120 and the base fingerprint image 60 displayed in the fingerprint sensing area A1 are in a one-to-one mapping relationship, and a size of the first fingerprint image 60 displayed in the fingerprint sensing area A1 and positions of the fingerprint grooves 52 and the fingerprint ridges 54 are consistent with the finger 50. Namely, in the embodiment, dark lines 62 of the base fingerprint image 60 displayed in the fingerprint sensing area A1 are located under the fingerprint grooves 52 of the finger 50, and bright lines 64 of the base fingerprint image 60 displayed in the fingerprint sensing area A1 are located under the fingerprint ridges 54 of the finger 50. Generally, the fingerprint ridges 54 may reflect more light to the image sensor 122, and are brighter, so as to form the bright lines 64 in the first fingerprint image 60. Therefore, in the embodiment, the base fingerprint image 60 is presented in the fingerprint sensing area A1, the bright lines 64 make the light irradiated on the fingerprint ridges 64 to be relatively intensive, and the dark lines 62 make the light irradiated on the fingerprint grooves 52 to be relatively weak. By using the different light intensities of the bright lines 64 and the dark lines 62, the contrast between the fingerprint ridges 54 and the fingerprint grooves 52 is enhanced. Namely, the fingerprint grooves 52 are emitted with a weaker light intensity, while the fingerprint ridges 54 are emitted the original high light intensity. Therefore, in the second fingerprint image, the dark lines formed by the fingerprint grooves 52 may be darker to effectively enhance the contrast between the bright lines and the dark lines, so that a success rate and accuracy of fingerprint recognition may be effectively enhanced.

In an embodiment, the controller 130 may directly use the second fingerprint image as a final fingerprint image to perform subsequent fingerprint recognition processes. However, in another embodiment, the controller 130 may also determine whether a brightness difference between the bright lines and the dark lines of the second fingerprint image is within a predetermined range. Being within the predetermined range may mean that the brightness difference is greater than a predetermined value, or that the brightness difference is greater than or equal to a predetermined value. The brightness difference may be represented by a difference obtained by subtracting a brightness of the bright lines by a brightness of the dark lines, or may be represented by a quotient obtained by dividing the brightness of the bright lines by the brightness of the dark lines.

If the brightness difference is within the predetermined range, the second fingerprint image is stored as a final fingerprint image, and the controller performs fingerprint recognition according to the second fingerprint image. On the contrary, if the brightness difference is not within the predetermined range, the finger 50 is illuminated again and a fingerprint image is obtained. For example, if the brightness difference does not meet the predetermined range, the fingerprint of the finger 50 is read again for N times and an $(N+2)^{th}$ fingerprint image is obtained until a brightness difference between bright lines and dark lines of the $(N+2)^{th}$ fingerprint image is within the predetermined range, and the $(N+2)^{th}$ fingerprint image is stored as the final fingerprint image, where the $(N+2)^{th}$ fingerprint image is the fingerprint image obtained when the controller 130 commands the display panel 110 to display an $(N+1)^{th}$ fingerprint image in the fingerprint sensing area A1 to emit the illumination beam 111 to the finger 50 for an $(N+2)^{th}$ time, and N is a positive integer. In the following description, a flowchart is used to specifically describe the situation that the finger is photographed by N times.

Figure 3:
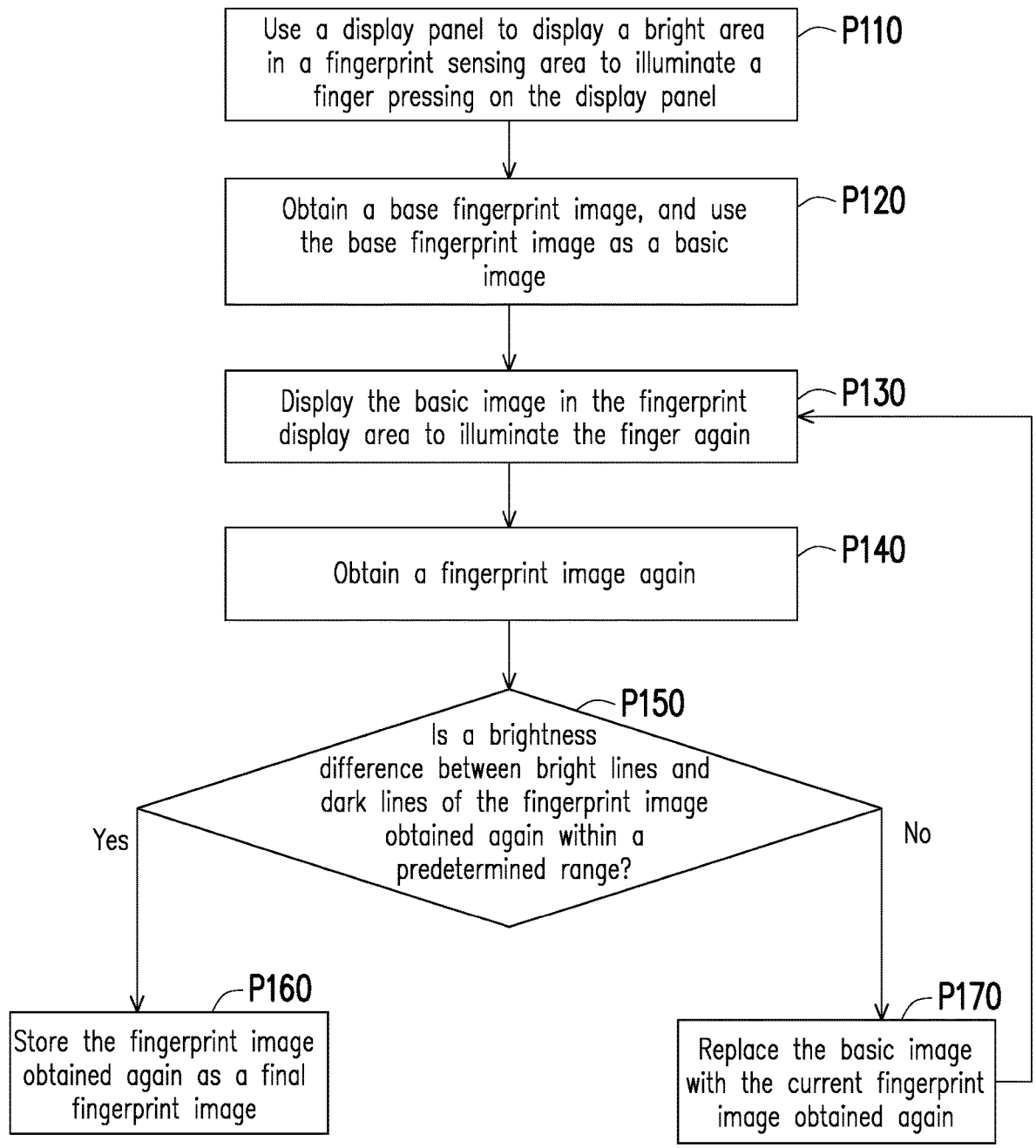
FIG. 3 is a flowchart of a fingerprint sensing method according to an embodiment of the invention.

FIG. 3 is a flowchart of a fingerprint sensing method according to an embodiment of the invention. Please referring to FIG. 1, FIG. 2 and FIG. 3, the fingerprint sensing method of the embodiment may be executed by the above-mentioned electronic device 100 having fingerprint sensing function, and the fingerprint sensing method includes the following steps. First, step P110 is executed to use the display panel 110 to display a bright area in the fingerprint sensing area A1 to illuminate the finger 50 pressed on the display panel 110. Then, step P120 is executed to obtain a base fingerprint image, and take the base fingerprint image as a basic image. Then, step P130 is executed to control the light-emitting pixels of the display panel to display the basic image in the fingerprint display area A1 to emit the illumination beam 111 to the finger 50 again. Then, step P140 is executed to obtain a fingerprint image, for example, to obtain the second fingerprint image again.

In an embodiment, after step P140, the obtained second fingerprint image may be directly used as the final fingerprint image for subsequent fingerprint recognition processes. However, in the embodiment, after step P140, step P150 may be performed to determine whether the brightness difference between the bright lines and the dark lines of the fingerprint image (for example, the second fingerprint image) obtained again is within the predetermined range. If the determination result is yes, step P160 is executed to store the fingerprint image (for example, the second fingerprint image) obtained again as the final fingerprint image to implement the subsequent fingerprint recognition processes. If the determination result is no, step P170 is executed to replace the basic image with a current fingerprint image (for example, the second fingerprint image) obtained again. Then, returning to step P130 to sequentially execute steps P130, P140, and P150. If the determination result of step P150 is no, steps P170, P130, P140, and P150 are continuously executed in sequence until the determination result of step P150 is yes, and then the loop is terminated, and step P160 is executed. In this way, it is ensured that the final fingerprint image is a fingerprint image with sufficient contrast between the bright lines and the dark lines. Such a loop is the aforementioned step of reading the fingerprint image of the finger 50 by N times again and obtaining the $(N+2)^{th}$ fingerprint image, until the brightness difference between the bright lines and the dark lines of the $(N+2)^{th}$ fingerprint image is within the predetermined range. The other details of the fingerprint sensing method of the embodiment have been described in detail in the above-mentioned embodiment of the electronic device 100 having fingerprint sensing function, which are not be repeated.

In an embodiment, the controller 130 is, for example, a central processing unit (CPU), a microprocessor (microprocessor), a digital signal processor (DSP), a programmable controller, and a programmable logic device (PLD) or other similar devices or combinations of these devices, which is not limited by the invention. In addition, in an embodiment, the functions of the controller 130 may be implemented as a plurality of program codes. These program codes may be stored in a memory, and the controller 130 may execute the program codes. Alternatively, in an embodiment, each function of the controller 130 may be implemented as one or a plurality of circuits. The invention does not limit the use of software or hardware to implement the functions of the controller 130.

In summary, in the electronic device having fingerprint sensing function and the fingerprint sensing method of the embodiments of the invention, by controlling the display panel to display the fingerprint image obtained for the first time in the fingerprint display area, the light source with the shape of the base fingerprint image is used to emit the illumination beam to the finger again, so that the bright lines and the dark lines in the fingerprint image obtained for the second time may have a higher contrast, which effectively improves the success rate and accuracy of fingerprint recognition.

What is claimed is:

1. An electronic device having fingerprint sensing function, comprising:
  a display panel, having a surface configured to be pressed by a finger of a user; and
  a sensing module, disposed under the display panel,
  wherein the display panel displays a bright area in a fingerprint sensing area to emit an illumination beam to the finger, the sensing module obtains a base fingerprint image correspondingly, the display panel then displays the base fingerprint image in the fingerprint sensing area, so as to use the base fingerprint image as a light pattern to illuminate the finger, and the sensing module obtains a second fingerprint image correspondingly, and wherein dark lines of the base fingerprint image displayed in the fingerprint sensing area are located under fingerprint grooves of the finger, and bright lines of the base fingerprint image displayed in the fingerprint sensing area are located under fingerprint ridges of the finger.

2. The electronic device having fingerprint sensing function as claimed in claim 1, wherein when a brightness difference between bright lines and dark lines of the second fingerprint image is within a predetermined range, the second fingerprint image is stored as a final fingerprint image; and when the brightness difference between the bright lines and the dark lines of the second fingerprint image is not within the predetermined range, the finger is photographed again.

3. The electronic device having fingerprint sensing function as claimed in claim 2, wherein when the brightness difference between the bright lines and the dark lines of the second fingerprint image is not within the predetermined range, the step of photographing the finger comprises:
  photographing the finger N times to obtain an $(N+2)^{th}$ fingerprint image until a brightness difference between bright lines and dark lines of the $(N+2)^{th}$ fingerprint image is within the predetermined range, and storing the $(N+2)^{th}$ fingerprint image as the final fingerprint image, wherein the $(N+2)^{th}$ fingerprint image is a fingerprint image obtained when a controller commands the display panel to display an $(N+1)^{th}$ fingerprint image in the fingerprint sensing area to $(N+2)^{th}$ time illuminate the finger, where N is a positive integer.

4. The electronic device having fingerprint sensing function as claimed in claim 3, wherein the controller performs fingerprint recognition according to the final fingerprint image.

5. The electronic device having fingerprint sensing function as claimed in claim 2, wherein being within the predetermined range means that the brightness difference is greater than a predetermined value, or being within the predetermined range means that the brightness difference is greater than or equal to a predetermined value.

6. The electronic device having fingerprint sensing function as claimed in claim 1 wherein the bright area is a uniform bright area.

7. The electronic device having fingerprint sensing function as claimed in claim 1, further comprising a controller, electrically connected to the display panel and the sensing module, configured to control the illumination beam emitted by the display panel, and configured to control the light pattern according to a fingerprint image obtained by the sensing module.

8. A fingerprint sensing method, comprising:
  using a display panel to display a bright area in a fingerprint sensing area to illuminate a finger pressing on the display panel;
  obtaining a base fingerprint image;
  displaying the first fingerprint image in the fingerprint display area to illuminate the finger; and
  obtaining a second fingerprint image,
  wherein dark lines of the base fingerprint image displayed in the fingerprint sensing area are located under fingerprint grooves of the finger, and bright lines of the base fingerprint image displayed in the fingerprint sensing area are located under fingerprint ridges of the finger.

9. The fingerprint sensing method as claimed in claim 8, further comprising:
  determining whether a brightness difference between bright lines and dark lines of the second fingerprint image is within a predetermined range, when yes, storing the second fingerprint image as a final fingerprint image; and when no, photographing the finger to obtain a fingerprint image again.

10. The fingerprint sensing method as claimed in claim 9, wherein when the brightness difference between the bright lines and the dark lines of the second fingerprint image is not within the predetermined range, the step of photographing the finger to obtain the fingerprint image again comprises:
  obtaining an $(N+2)^{th}$ fingerprint image again until a brightness difference between bright lines and dark lines of the $(N+2)^{th}$ fingerprint image is within the predetermined range, and storing the $(N+2)^{th}$ fingerprint image as the final fingerprint image, wherein the $(N+2)^{th}$ fingerprint image is a fingerprint image obtained when the fingerprint sensing area displays an $(N+1)^{th}$ fingerprint image to illuminate the finger, where N is a positive integer.

11. The fingerprint sensing method as claimed in claim 10, further comprising: performing fingerprint recognition according to the final fingerprint image.

12. The fingerprint sensing method as claimed in claim 9, wherein being within the predetermined range means that the brightness difference is greater than a predetermined value, or being within the predetermined range means that the brightness difference is greater than or equal to a predetermined value.

13. The fingerprint sensing method as claimed in claim 8, wherein the bright area is a uniform bright area.

* * * * *

UNITED STATES PATENT AND TRADEMARK OFFICE
CERTIFICATE OF CORRECTION

PATENT NO. : 11,270,097 B2  
APPLICATION NO. : 17/092330  
DATED : March 8, 2022  
INVENTOR(S) : Chang Wei Yang Page 1 of 1

It is certified that error appears in the above-identified patent and that said Letters Patent is hereby corrected as shown below:

On the Title Page

Item [30], insert --Sep. 17, 2020 (CN) ………………………… 202010982431.8--

Signed and Sealed this
Twenty-first Day of June, 2022

Katherine Kelly Vidal
*Director of the United States Patent and Trademark Office*